US012608841B2

(12) United States Patent　　　　(10) Patent No.: US 12,608,841 B2
Peuhkurinen　　　　　　　　　　　　　(45) Date of Patent: Apr. 21, 2026

(54) PLANE ESTIMATION USING OBJECT DETECTION

(71) Applicant: Varjo Technologies Oy, Helsinki (FI)

(72) Inventor: Ari Antti Erik Peuhkurinen, Helsinki (FI)

(73) Assignee: Varjo Technologies Oy, Helsinki (FI)

( * ) Notice: Subject to any disclaimer, the term of this patent is extended or adjusted under 35 U.S.C. 154(b) by 316 days.

(21) Appl. No.: 18/158,863

(22) Filed: Jan. 24, 2023

(65) Prior Publication Data

US 2024/0249432 A1　　Jul. 25, 2024

(51) Int. Cl.
　　*G06T 7/73*　　　　(2017.01)
　　*G06V 20/20*　　　(2022.01)

(52) U.S. Cl.
　　CPC ................ *G06T 7/74* (2017.01); *G06V 20/20* (2022.01)

(58) Field of Classification Search
　　CPC ...................................................... G06T 7/73
　　See application file for complete search history.

(56) References Cited

U.S. PATENT DOCUMENTS

| | | | |
|---|---|---|---|
| 2015/0210312 A1 * | 7/2015 | Stein ..................... | B60W 30/14 701/41 |
| 2015/0310666 A1 * | 10/2015 | Meier .................. | H04N 5/2224 345/420 |
| 2022/0414910 A1 * | 12/2022 | Zhang .................... | G06V 10/46 |

FOREIGN PATENT DOCUMENTS

| | | | | |
|---|---|---|---|---|
| CN | 103413272 B | * | 12/2016 | |
| CN | 114677439 A | * | 6/2022 | ............... G06T 7/73 |
| JP | 2016218849 A | * | 12/2016 | |

* cited by examiner

*Primary Examiner* — Di Xiao
(74) *Attorney, Agent, or Firm* — Ziegler IP Law Group, LLC.

(57) ABSTRACT

Disclosed is system (100) comprising at least one server (102) configured to: obtain at least two images of real-world environment whose fields of view overlap at least partially; obtain pose information indicative of corresponding camera poses from which at least two images are captured; detect, in at least two images, at least one object (202A-202G) that is in contact with given plane (204, 208) present in real-world environment; identify, in at least two images, same features (206A-206J) of at least one object that lie on given plane; determine poses of same features, wherein pose of given same feature is determined, based on disparity in two-dimensional positions of given same feature in at least two images and corresponding camera poses from which at least two images are captured; and estimate given plane based on poses of same features.

18 Claims, 4 Drawing Sheets

OBTAIN IMAGES
302

OBTAIN POSE INFORMATION
304

DETECT OBJECT(S)
306

IDENTIFY SAME FEATURES
308

DETERMINE POSES OF FEATURES
310

ESTIMATE PLANE
312

PLANE ESTIMATION USING OBJECT DETECTION

TECHNICAL FIELD

The present disclosure relates to systems for plane estimation using object detection. The present disclosure also relates to computer-implemented methods for plane estimation using object detection. The present disclosure relates to computer program products for plane estimation using object detection.

BACKGROUND

Conventionally, in applications that involve use of extended reality technology, estimation of planes present in a real-world environment of using the extended reality, is performed. Estimation of such planes is performed using various conventional equipment and techniques for enabling, for example, placement of virtual objects in extended-reality images.

However, the conventional equipment and techniques suffer from certain limitations which result in inaccurate estimation of the planes present in the real-world environment. When such an inaccurate plane estimation is used, for example, for placing virtual objects when generating the extended-reality images, there is provided a non-immersive (i.e., unrealistic) visual experience to a user. Specifically, when a plane is estimated inaccurately, its depth from a viewpoint would also be inaccurate, and this results in the virtual objects being not placed correctly in the extended-reality images. In an example, when a plane representing a top surface of a coffee table is estimated incorrectly, a virtual coffee cup appears to be floating above the coffee table when it should have appeared to be kept on the coffee table. In another example, when a plane representing a surface of a wall is estimated incorrectly, a virtual painting mounted on the wall appears to be floating in front of the wall rather than appearing to be hung on the wall. Moreover, the incorrect placement of the virtual objects based on inaccurate plane estimation may even cause motion sickness for the user viewing such non-immersive extended-reality images.

Therefore, in light of the foregoing discussion, there exists a need to overcome the aforementioned drawbacks associated with existing systems and methods for plane estimation.

SUMMARY

The present disclosure seeks to provide an improved system for plane estimation. The present disclosure also seeks to provide a computer-implemented method for plane estimation. The present disclosure also seeks to provide a computer program product for plane estimation. An aim of the present disclosure is to provide a solution that overcomes at least partially the problems encountered in prior art.

In one aspect, an embodiment of the present disclosure provides a system comprising at least one server configured to:

obtain at least two images of a real-world environment whose fields of view overlap at least partially;

obtain pose information indicative of corresponding camera poses from which the at least two images are captured;

detect, in the at least two images, at least one object that is in contact with a given plane present in the real-world environment;

identify, in the at least two images, same features of the at least one object that lie on the given plane;

determine poses of the same features, wherein a pose of a given same feature is determined, based on a disparity in two-dimensional positions of the given same feature in the at least two images and the corresponding camera poses from which the at least two images are captured; and estimate the given plane based on the poses of the same features.

In another aspect, an embodiment of the present disclosure provides a computer-implemented method comprising:

obtaining at least two images of a real-world environment whose fields of view overlap at least partially;

obtaining pose information indicative of corresponding camera poses from which the at least two images are captured;

detecting, in the at least two images, at least one object that is in contact with a given plane present in the real-world environment;

identifying, in the at least two images, same features of the at least one object that lie on the given plane;

determining poses of the same features, wherein a pose of a given same feature is determined, based on a disparity in two-dimensional positions of the given same feature in the at least two images and the corresponding camera poses from which the at least two images are captured; and estimating the given plane based on the poses of the same features.

In yet another aspect, an embodiment of the present disclosure provides a computer program product comprising a non-transitory machine-readable data storage medium having stored thereon program instructions that, when executed by a processor, cause the processor to:

obtain at least two images of a real-world environment whose fields of view overlap at least partially;

obtain pose information indicative of corresponding camera poses from which the at least two images are captured;

detect, in the at least two images, at least one object that is in contact with a given plane present in the real-world environment;

identify, in the at least two images, same features of the at least one object that lie on the given plane;

determine poses of the same features, wherein a pose of a given same feature is determined, based on a disparity in two-dimensional positions of the given same feature in the at least two images and the corresponding camera poses from which the at least two images are captured; and estimate the given plane based on the poses of the same features.

Embodiments of the present disclosure substantially eliminate or at least partially address the aforementioned problems in the prior art, and enable accurate plane estimation, that allows to precisely place any virtual object correctly in a given extended-reality image and, thus, provide an immersive and visually-pleasing experience to a user.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those skilled in the art will understand that the drawings are not to scale. Wherever possible, like elements have been indicated by identical numbers.

Embodiments of the present disclosure will now be described, by way of example only, with reference to the following diagrams wherein.

Figure 1A:
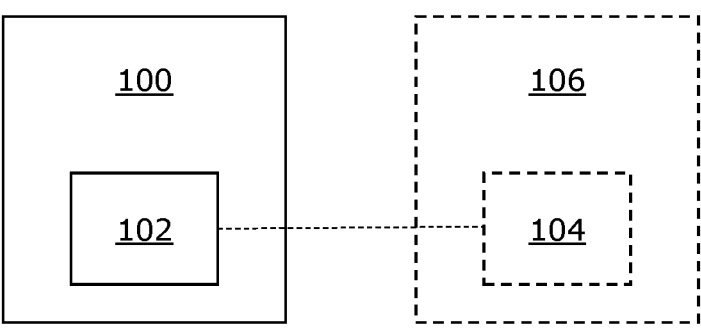
FIGS. 1A,1B, and 1C illustrate an environment in which a system is used, in accordance with various embodiments of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In one aspect, an embodiment of the present disclosure provides a system comprising at least one server configured to:

obtain at least two images of a real-world environment whose fields of view overlap at least partially;

obtain pose information indicative of corresponding camera poses from which the at least two images are captured;

detect, in the at least two images, at least one object that is in contact with a given plane present in the real-world environment;

identify, in the at least two images, same features of the at least one object that lie on the given plane;

determine poses of the same features, wherein a pose of a given same feature is determined, based on a disparity in two-dimensional positions of the given same feature in the at least two images and the corresponding camera poses from which the at least two images are captured; and estimate the given plane based on the poses of the same features.

In another aspect, an embodiment of the present disclosure provides a computer-implemented method comprising:

obtaining at least two images of a real-world environment whose fields of view overlap at least partially;

obtaining pose information indicative of corresponding camera poses from which the at least two images are captured;

detecting, in the at least two images, at least one object that is in contact with a given plane present in the real-world environment;

identifying, in the at least two images, same features of the at least one object that lie on the given plane;

determining poses of the same features, wherein a pose of a given same feature is determined, based on a disparity in two-dimensional positions of the given same feature in the at least two images and the corresponding camera poses from which the at least two images are captured; and estimating the given plane based on the poses of the same features.

In yet another aspect, an embodiment of the present disclosure provides a computer program product comprising a non-transitory machine-readable data storage medium having stored thereon program instructions that, when executed by a processor, cause the processor to:

obtain at least two images of a real-world environment whose fields of view overlap at least partially;

obtain pose information indicative of corresponding camera poses from which the at least two images are captured;

detect, in the at least two images, at least one object that is in contact with a given plane present in the real-world environment;

identify, in the at least two images, same features of the at least one object that lie on the given plane;

determine poses of the same features, wherein a pose of a given same feature is determined, based on a disparity in two-dimensional positions of the given same feature in the at least two images and the corresponding camera poses from which the at least two images are captured; and estimate the given plane based on the poses of the same features.

The present disclosure provides the aforementioned system, the aforementioned computer-implemented method, and the aforementioned computer program product. Herein, the poses of the same features that lie on the given plane in the at least two images are determined, and that enables accurate estimation of the given plane. In this regard, based on the accurate estimation of the given plane, the at least one server can generate extended-reality images in which virtual objects are precisely placed with respect to the given plane that has been accurately estimated. Hence, a user is provided with a highly immersive and visually pleasing experience while viewing such extended-reality images.

The at least one server controls an overall operation of the system. The at least one server is communicably coupled to at least one camera (for example video see-through camera(s) on a head-mounted device (HMD)), to at least one device (such as the HMD, a teleport device, or similar) comprising the at least one camera, or to a data repository whereat the at least two images are pre-stored. In an embodiment, the at least one server is implemented as a cloud-based server. In another embodiment, the at least one server is implemented as a processor of a computing device. Examples of the computing device include, but are not limited to, a laptop computer, a desktop computer, a tablet computer, a phablet, a personal digital assistant, a workstation, a console. In yet another embodiment, the at least one server is implemented as a part of the at least one device comprising the at least one camera.

It will be appreciated that the term "at least one server" refers to "a single server" in some implementations, and to "a plurality of servers" in other implementations. When the system comprises the single server, all operations of the system are performed by the single server. When the system comprises the plurality of servers, different operations of the system are performed by different (specially configured) servers from amongst the plurality of servers. As an example, a first server from amongst the plurality of servers may be configured to receive and process the at least two images and the pose information, and a second server from amongst the plurality of servers may be configured to estimate the given plane.

Throughout the present disclosure, the "field of view" of an image refers to an observable extent of the real-world environment that is captured in the image. The field of view of the image is expressed in terms of degrees or radians. The field of view of the image may depend on a size of an image sensor of a camera that captured the image.

Herein, the fields of view of the at least two images at least partially overlap, i.e., at least some portion of the field of view is common for the at least two images. In this regard, a common region of the same real-world environment corresponding to this overlap would be visible in each of the at least two images. The common region would include one or more objects (and specifically, features of the one or more objects). An extent of overlap of the fields of view of the at least two images could be expressed in terms of degrees, radians, a percentage of a field of view of the at least one camera that captured the at least two images. As an example, the fields of view may have a 50 percent overlap. As another example, the extent of overlap of the fields of view may lie in a range of 30-150 degrees. It will be appreciated that larger is an overlap in the fields of view, larger is a number of same features that can be identified in the at least two images, and used for plane estimation. This is typically a case when the at least two images have been captured consecutively and the camera pose has not changed drastically while the at least two images are being captured. For example, in an implementation, the at least two images may comprise three images I1, I2, and I3. Herein, the images I1 and I2 may have 90 degrees of overlapping fields of view, and said images may be used to estimate any given plane that is present in a first region of the real-world environment corresponding to such overlapping fields of view. Likewise, the images I1, I2 and I3 may have 60 degrees of overlapping fields of view, and said images may be used to estimate any given plane that is present in a second region of the real-world environment corresponding to such overlapping fields of view.

Throughout the present disclosure, the term "camera" refers to a device used for capturing images of the real-world environment. The camera may be used for capturing images of the real-world environment for a variety of applications including but not limited to extended-reality (XR), inspection of the real-world environment, machine vision, gaming, art, and so forth. Optionally, the at least one camera is implemented as at least one visible light camera. Examples of a given visible light camera include, but are not limited to, a Red-Green-Blue-Depth (RGB), a monochrome camera. It will be appreciated that the at least one camera could be implemented as a combination of the given visible light camera and a depth camera. Examples of the depth camera include, but are not limited to, a Red-Green-Blue-Depth (RGB-D) camera, a ranging camera, a Light Detection and Ranging (LiDAR) camera, a flash LiDAR camera, a Time-of-Flight (ToF) camera, a Sound Navigation and Ranging (SONAR) camera, a laser rangefinder, a stereo camera, a plenoptic camera, an infrared camera, a structured-light scanner, and an ultrasound imaging equipment. For example, the at least one camera may be implemented as the stereo camera.

Optionally, the at least one server obtains the at least two images from at least one camera of a device (for example, such as an HMD or a teleport device). Optionally, in this regard, the system is implemented in the device itself, and the at least one server is implemented as a processor of the device. In such implementations, processing operations on the at least two images are performed by the at least one server (namely, the processor) at the device. In a case where the device is an HMD, the at least one camera is physically coupled to the processor of the HMD (for example, attached via mechanical and/or electrical connections to components of the HMD). For example, the at least one camera may be arranged on an outer surface of the HMD that faces the real-world environment to provide video see-through capabilities in the HMD.

Alternatively, optionally, the at least one server obtains the at least two images from at least one device that comprises the at least one camera. Optionally, in such implementations, the at least one device may be an HMD or a teleport device. In such implementations, the processing operations on the at least two images are performed at the at least one server itself and the at least two images after processing are then sent to the HMD for displaying, wherein the at least one server is communicably coupled to the HMD. Optionally, the at least two images after processing are sent simultaneously to a plurality of HMD devices, for displaying to multiple users at once.

Yet alternatively, optionally, the at least one server obtains the at least two images from the data repository. In such implementations, the at least two images are pre-stored in the data repository and are sent to the at last one server, for the at least one server to perform the processing operations on the at least two images. Optionally, in such implementations, the system further comprises the data repository communicably coupled to the at least one server. Optionally, the data repository is also used during object detection.

Throughout the present disclosure, the term "camera pose" encompasses both position and orientation of the at least one camera which captured the at least two images. A perspective of a given camera changes when the given camera is moved around the real-world environment with a same orientation or with changing orientations, or when the given camera is stationary and only an orientation of the given camera changes, or similar. The at least two images are captured from slightly different perspectives (since their fields of view overlap at least partially), and hence, the respective camera poses for each of the at least two images would be different.

Optionally, the pose information is generated by a camera pose-tracking means. The camera pose-tracking means is a specialized equipment that is employed to detect camera poses of the at least one camera in a 3D space of the real-world environment. Pursuant to embodiments of the present disclosure, the camera pose-tracking means is implemented as a true six Degrees of Freedom (6DoF) tracking system.

The camera pose-tracking means could be implemented as at least one of: an optics-based tracking system (which utilizes, for example, infrared beacons and detectors, infrared cameras, visible-light cameras, detectable objects and detectors, and the like), an acoustics-based tracking system, a radio-based tracking system, a magnetism-based tracking system, an accelerometer, a gyroscope, an Inertial Measurement Unit (IMU), a Timing and Inertial Measurement Unit (TIMU), a Global Positioning System (GPS) tracking system. As an example, a detectable object may be an active infra-red (IR) LED, a visible LED, a laser illuminator, a Quick Response (QR) code, an ArUco marker, an anchor marker, a Radio Frequency Identification (RFID) marker, and the like. A detector may be implemented as at least one of: an IR camera, an IR transceiver, a visible light camera, an RFID reader. Optionally, the camera pose-tracking means is implemented as at least one processor that is configured to determine the pose of the at least one camera using a simultaneous localization and mapping (SLAM) technique.

Optionally, the at least one server is configured to process the pose information. Optionally, the pose information is indicative of the corresponding camera poses in a 3D coordinate space of the real-world environment. Optionally, the pose information comprises camera pose-tracking data of the cameras. Optionally, the at least one server employs at least one data processing algorithm to process the camera pose-tracking data of the camera. The camera pose-tracking data may be in form of images, IMU/TIMU values, motion sensor data values, magnetic field strength values, or similar. Correspondingly, the data processing algorithm(s) is/are employed to process the camera pose-tracking data. Moreover, the camera pose-tracking means employs either an outside-in tracking technique or an inside-out tracking technique for collecting the camera pose-tracking data. Optionally, the at least two images are mapped with a 3D model of the real-world environment to determine the corresponding camera poses from which the at least two images are captured.

Throughout the present disclosure, the term "given plane" refers to any two-dimensional (2D) planar surface present in the real-world environment. In simple terms, the given plane is a flat surface. The real-world environment may include one or more planes, out of which at least the given plane is represented in the at least two images. Notably, out of the multiple objects that are expected to be commonly present in the real-world environment, only the at least one object that is in contact with the given plane is detected in the at least two images, by the at least one server. Herein, for the at least one object to be in contact with the given plane, at least some portion or a point of the at least one object must be in contact with the given plane. The term "object" encompasses a physical object or a part of the physical object. Moreover, the term "object" encompasses animate objects (for example, such as people, animals, birds, and similar), as well as inanimate objects (for example, such as furniture, décor items, toys, gadgets, and similar). For example, the at least one server may detect that a table, a pair of chairs, and a person are in contact with a floor in a room, where the floor is the given plane.

Optionally, the given plane is any of: a floor, a wall, a ceiling, a table top. Typically, in any real-world environment, at least one of: the floor, the wall, the ceiling, the table top, is present and there are also present objects in contact therewith. Therefore, the given plane may beneficially be any of these, so that the given plane can be estimated accurately, for subsequently enabling accurate placement of virtual objects with respect to the given plane. Pursuant to embodiments of the present disclosure, advantageously, any two-dimensional plane present in the real-world environment can be estimated by the at least one server.

Optionally, when detecting the at least one object that is in contact with the give plane, the at least one server is configured to employ at least one object detection algorithm. The at least one object detection algorithm enables in detecting the at least one object in contact with the given plane, as well as in detecting the given plane. Examples of the at least one object detection algorithm include, but are not limited to, a region-based convolutional network method (R-CNN) algorithm, a fast region-based convolutional network (Fast R-CNN) algorithm, a faster region-based convolutional network (Faster R-CNN) algorithm, a region-based fully convolutional networks (R-FCN) algorithm, a single shot detector (SSD) algorithm, a spatial pyramid pooling (SPP-net) algorithm, and a you-only-look-once (YOLO) algorithm. Optionally, the at least one object detection algorithm is implemented by a machine learning model. Optionally, training data associated with the machine leaning model is stored in the data repository.

A "same feature" of the at least one object that lies on the given plane is that common feature of the at least one object which is represented in the at least two images as lying on the given plane. It will be appreciated that while an object may have multiple features that lie on the given plane, only a few (i.e., one or more) features from amongst the multiple features may be identified as the same features.

Examples of features of objects include, but are not limited to, points (for example, such as points of contact (namely, contact points)), edges, corners, ridges, and high-frequency features. Optionally, the at least one server is configured to employ at least one feature recognition algorithm to extract the same features of the at least one object that lie on the given plane, from the at least two images. Examples of the at least one feature recognition algorithm include, but are not limited to, an edge-detection algorithm (for example, such as Canny edge detector, Deriche edge detector and the like), a corner-detection algorithm (for example, such as Harris & Stephens corner detector, Shi-Tomasi corner detector, Features from Accelerated Segment Test (FAST) corner detector and the like), a feature descriptor algorithm (for example, such as Binary Robust Independent Elementary Features (BRIEF), Gradient Location and Orientation Histogram (GLOH), Histogram of Oriented Gradients (HOG), and the like), and a feature detector algorithm (for example, such as the SIFT, the SURF, Oriented FAST and rotated BRIEF (ORB), and the like).

Notably, the same features of the at least one object that lie on the given plane are identified from within respective portions of the at least two images that represent the overlap in the fields of view of the at least two images. In other words, only those features of the at least one object are identified as the same features, which are commonly represented in the at least two images as lying on the given plane. Notably, the same features that are identified enable estimating of the given plane. For example, the at least one server may identify, in the at least two images, that the same features of the at least object comprises a bottom edge of a door, a point of contact of a wheel of a chair with the floor, where the floor is the given plane.

Optionally, the same features identified in the at least two images comprise at least one of:

three non-collinear points, an edge and a point that is not on the edge, two edges that are intersecting, two edges that are parallel.

In this regard, identifying at least one of the aforesaid types of features enables in accurately estimating the given plane. It will be appreciated that a larger number of features can be identified to make the estimation of the given plane more accurate. In an embodiment, the same features may be three non-collinear points (i.e., three points that do not lie on a single line), wherein positions of the three non-collinear points enable in estimating the given plane. In such a case, three non-collinear points is only a minimum requirement; a larger number of non-collinear points can be considered for plane estimation. In another embodiment, the same features may be an edge and a point that is not on the edge, wherein a position of the edge, an orientation of the edge, and a position of the point enable in estimating the given plane. The edge may be understood to be a line segment or a part of a line. The position of the edge may be indicated by positions of endpoints of the edge, a position of intermediate points of the edge, or similar. In yet another embodiment, the same features may be two edges that are intersecting (the edges might be already intersecting as they are represented in the at least two images or might intersect upon extending the edges), wherein respective positions of the two intersecting edges and respective orientations of the two intersecting edges enable in estimating the given plane. In still another embodiment, the same features may be two edges that are parallel (i.e., the edges that will never intersect), wherein respective positions of the two parallel edges and respective orientations of the two parallel edges enable in estimating the given plane. Thus, advantageously, estimation of the given plane is simplified, and its accuracy is improved as the same features are suitable to be used in mathematical equations for estimating the plane.

Optionally, a given point is any one of: a corner, a point of contact of a curved surface with the given plane, a point that is selected from an edge. Corners are points where two surfaces or two edges meet each other, and thus the corners are easily identifiable features that have well-defined positions. Curved surfaces may contact the given plane at one or more points and positions of such points are typically clearly indicated in the at least two images. Points selected from edges are indicative of a geometric relationship between the edges and the given plane. Thus, beneficially, the given point, as described above, is easily determined by the at least server using well-known feature recognition algorithms.

It will be appreciated that a two-dimensional position of a same feature in different images changes with respect to a change in the camera pose when capturing the different images. Hence, as different camera poses are employed for capturing the at least two images, there arises disparity in the two-dimensional positions of the same feature as represented in the at least two images. For features such as edges that have certain orientations associated therewith, their two-dimensional orientation is also indicated by the two-dimensional positions of any two points on the edges. For example, a camera pose while capturing a first image may be described as a three-dimensional position P1 and a three-dimensional orientation O1. In the first image, a point X1 may have a two-dimensional position of (5, 10), and an edge Y1 may lie along two-dimensional positions of (2, 5) and (2, 25). The edge Y1 is represented as a vertical edge in the first image. Then, the camera pose changes for capturing a second image, to a three-dimensional position P2, and a three-dimensional orientation O2. In the second image, the point X1 may have a two-dimensional position of (7, 10), and the edge Y1 may lie along two-dimensional positions of (2, 5) and (5, 36). The edge Y1 is represented as a slanting edge in the second image.

The poses of the same features are determined using a triangulation technique, based on the disparity in the two-dimensional positions of the given same feature and the corresponding camera poses. Herein, the pose of the given same feature represents an actual position and/or an actual orientation of the given same feature in the real-world environment. Optionally, the poses of the same features are represented using the same 3D coordinate space of the real-world environment. Optionally, the orientation of the given same feature is represented by using one of: a three-dimensional direction vector indicative of the orientation, three-dimensional positions of two points that lie along the given same feature, an angular separation (for example, in degrees, radians, and the like) from pre-known orientations (such as horizontal axis, vertical axis, and the like). Referring to the above-mentioned example, a pose of the point X1 in the real-world environment may be determined as a position (10, 20, 15), and a pose of the edge Y1 in the real-world environment may be determined to be such that the edge Y1 lies between (5, 10, 15) and (6, 50, 15).

Furthermore, optionally, the at least one server is further configured to:

access, from a data repository, information indicative of physical dimensions of the at least one object;

determine, from said information, at least one of: a physical length of a given edge of the at least one object that lies on the given plane, a physical distance between at least two points of the at least one object that lie on the given plane; and determine a pose of at least one of: the given edge, the at least two points, based on:

a camera pose from which a given image from amongst the at least two images is captured, at least one of: a length of the given edge, a distance between the at least two points as represented in the given image, at least one of: the physical length of the given edge, the physical distance between the at least two points.

In this regard, optionally, the real-world environment is pre-scanned in order to obtain said information and store said information in the data-repository. For example, the real-world environment may be a room that is pre-scanned, for example, using a camera, to obtain the information indicative of physical dimensions of objects (for example, such as a sofa, a painting, and the like). Thus, the physical dimensions of the at least one object could be pre-known. Certain objects, for example, such as a drink can, a laptop, and similar, have well-known dimensions that may be pre-stored in the data repository.

The "physical dimensions" of the at least one object refers to actual dimensions (i.e., a length, a breadth, a height, a diameter of the at least one object, and the like) of the at least one object in the real-world environment. A technical effect of using the physical dimensions of the at least one object (such as at least one of: the physical length of the given edge, the physical distance between the at least two points) for determining the pose of the given edge and/or the at least two points is that it enables the at least one server to beneficially determine the poses of the same features from even single images. Using knowledge of the disparity from the at least two images and a correlation with the physical dimensions makes the pose estimation more accurate. The at least one of: the physical length of the given edge, the physical distance between the at least two points, is compared with the at least one of: the length of the given edge, the distance between the at least two points in the given image to firstly determine a photogrammetric relationship between the given image and the real-world environment. Then, the at least one server more accurately determines the disparity in the two-dimensional positions of the at least one of: the given edge, the at least two points, and then uses said disparity and the camera pose from which the given image is captured, to accurately determine the pose of the at least one of: the given edge, the at least two points. Optionally, the at least one of: the length of the given edge, the distance between the at least two points in the given image, is represented in terms of a number of pixels.

Notably, once the poses of the same features are determined by the at least one server, specifications of the poses are used in one or more mathematical equations for estimating the given plane. Herein, any mathematical equation that is used for estimating the given plane depends on a type of the same features that are identified. It will be appreciated that the given plane can be described in the 3D coordinate space of the real-world environment in a manner analogous to how lines are described in a two-dimensional space (using a point-slope form of equations). The given plane can be naturally described in any of the following ways:

a point-normal form using a vector and a point lying in the given plane, two vectors lying in the given plane, three or more points lying in the given plane, or similar.

For example, a mathematical equation that is used for estimating the given plane when the same features comprise three non-collinear points, is different from a mathematical equation that is used for estimating the given plane when the same features comprise an edge and a point that is not on the edge.

Moreover, optionally, the at least one server is configured to:

determine a distance between the given plane and a given camera pose from which a given image from amongst the at least two images is captured;

determine, based on said distance, a position in the given image at which at least one virtual object is to be superimposed; and superimpose the at least one virtual object at the determined position in the given image to generate a given extended-reality image.

In this regard, the distance between the given plane and the given camera pose indicates a depth of the given plane from the given camera. For example, said distance between the given plane and the given camera pose may indicate the height of an HMD device on which the camera is mounted from a floor, where the floor is the given plane. Herein, knowing the depth (i.e., the said distance) of the given plane from the given camera pose enables the at least one server to determine the correct position at which the at least one virtual object is to be placed in the given image with respect to the given plane. The at least one virtual object is to be placed, for example, on the given plane, above the given plane, below the given plane, in front of the given plane, behind the given plane, or similar. In this regard, determining the correct position of placement of the at least one virtual object in the given image, based on the distance between the given plane and the given camera pose, enables in beneficially providing a desirable visual effect of proper, realistic positioning of the at least one virtual object in an extended-reality (XR) environment. Subsequently, the at least one virtual object is superimposed (via image processing techniques) in the given image to generate the given XR image, where the given XR image is used for XR applications. Herein, the term "extended-reality" encompasses virtual-reality (VR), augmented-reality (AR), mixed-reality (MR), and the like. Optionally, the at least one server is communicably coupled to one or more XR devices (for example, such as HMDs that present XR images, XR glasses, and similar), wherein the at least one server is further configured to send the given XR image to the one or more XR devices, for enabling displaying of the given XR image to one or more users of the one or more XR devices.

The present disclosure also relates to the computer-implemented method as described above. Various embodiments and variants disclosed above, with respect to the aforementioned system, apply mutatis mutandis to the computer-implemented method.

Optionally, the computer-implemented method further comprises:

determining a distance between the given plane and a given camera pose from which a given image from amongst the at least two images is captured;

determining, based on said distance, a position in the given image at which at least one virtual object is to be superimposed; and superimposing the at least one virtual object at the determined position in the given image for generating a given extended-reality image.

Optionally, the given plane is any of: a floor, a wall, a ceiling, a table top.

Optionally, the same features identified in the at least two images comprise at least one of:

three non-collinear points, an edge and a point that is not on the edge, two edges that are intersecting, two edges that are parallel.

Optionally, a given point is any one of: a corner, a point of contact of a curved surface with the given plane, a point that is selected from an edge.

Optionally, the computer-implemented method further comprises:

accessing, from a data repository, information indicative of physical dimensions of the at least one object;

determining, from said information, at least one of: a physical length of a given edge of the at least one object that lies on the given plane, a physical distance between at least two points of the at least one object that lie on the given plane; and determining a pose of at least one of: the given edge, the at least two points, based on:

a camera pose from which a given image from amongst the at least two images is captured, at least one of: a length of the given edge, a distance between the at least two points as represented in the given image, at least one of: the physical length of the given edge, the physical distance between the at least two points.

The present disclosure also relates to the computer program product as described above. Various embodiments and variants disclosed above, with respect to the aforementioned system and the aforementioned computer-implemented method, apply mutatis mutandis to the computer program product.

Throughout the present disclosure, the term "computer program product" refers to a software product comprising program instructions that are recorded on the non-transitory machine-readable data storage medium, wherein the software product is executable upon a computing hardware (i.e., the processor) for implementing the aforementioned steps of the computer-implemented method for plane estimation using object detection.

The program instructions stored on the non-transitory machine-readable data storage medium can direct the processor to function in a particular manner, such that the processor executes processing steps for the computer-implemented method for plane estimation using object detection. Examples of the non-transitory machine-readable data storage medium includes, but are not limited to, an electronic storage device, a magnetic storage device, an optical storage device, an electromagnetic storage device, a portable computer diskette, a hard disk, a random access memory (RAM), a read-only memory (ROM), an erasable programmable read-only memory (EPROM or Flash memory), a portable compact disc read-only memory (CD-ROM), a digital versatile disk (DVD), a memory stick, a mechanically encoded device such as punch-cards or raised structures in a groove having instructions recorded thereon, or any suitable combination thereof.

Throughout the present disclosure, the term "processor" refers to a device that is capable of processing the program instructions of the computer program product. Optionally, the processor is implemented as a part of a computing device. The processor may, for example, be a microprocessor, a microcontroller, a processing unit, or similar.

Optionally, the program instructions, when executed by the processor, further cause the processor to:

determine a distance between the given plane and a given camera pose from which a given image from amongst the at least two images is captured;

determine, based on said distance, a position in the given image at which at least one virtual object is to be superimposed; and superimpose the at least one virtual object at the determined position in the given image to generate a given extended-reality image.

Optionally, the given plane is any of: a floor, a wall, a ceiling, a table top.

Optionally, the same features identified in the at least two images comprise at least one of:

three non-collinear points, an edge and a point that is not on the edge, two edges that are intersecting, two edges that are parallel.

Optionally, a given point is any one of: a corner, a point of contact of a curved surface with the given plane, a point that is selected from an edge.

Optionally, the program instructions, when executed by the processor, further cause the processor to:

access, from a data repository, information indicative of physical dimensions of the at least one object;

determine, from said information, at least one of: a physical length of a given edge of the at least one object that lies on the given plane, a physical distance between at least two points of the at least one object that lie on the given plane; and determine a pose of at least one of: the given edge, the at least two points, based on:

a camera pose from which a given image from amongst the at least two images is captured, at least one of: a length of the given edge, a distance between the at least two points as represented in the given image, at least one of: the physical length of the given edge, the physical distance between the at least two points.

DETAILED DESCRIPTION OF THE DRAWINGS

Figure 1B:
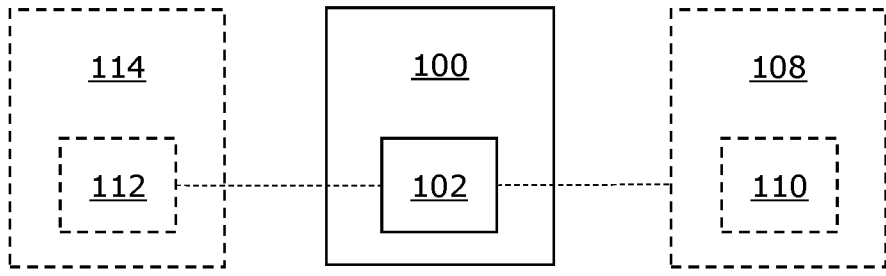
Figure 1C:
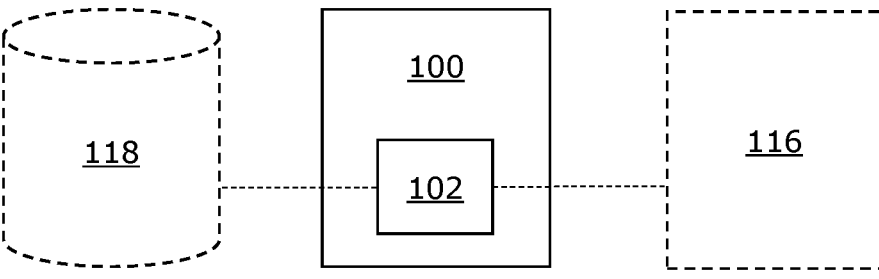

Referring to FIGS. 1A, 1B and 1C, illustrated is an environment in which a system 100 is used, in accordance with different embodiments of the present disclosure. Referring to FIGS. 1A, 1B and 1C collectively, the system 100 comprises at least one server (depicted as a server 102). Referring to FIG. 1A, optionally, the server 102 is communicably coupled to a camera 104, wherein the camera 104 is part of a head mounted display (HMD) device 106. In such a case the at least two images are received from the camera 104. Referring to FIG. 1B, alternatively, optionally, the server 102 is communicably coupled to an HMD device 108, where the HMD device 108 comprises a camera 110, and the server 102 is communicably coupled to a camera 112, where the camera 112 is part of a teleport device 114 (for example, a drone). Referring to FIG. 1C, yet alternatively, optionally, the server 102 is communicably coupled to an HMD device 116 and to a data repository 118.

Figure 2A:
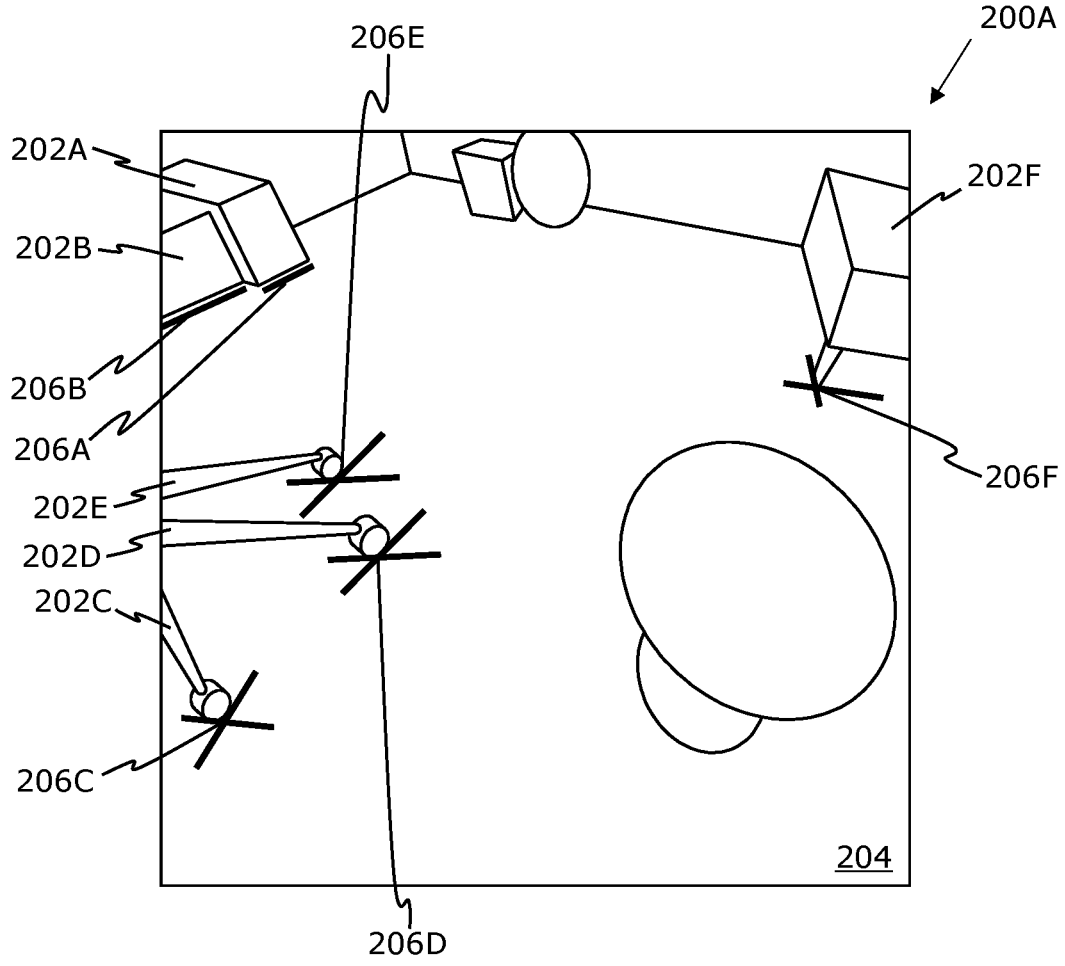
FIG. 2A is an exemplary image showing identified features of at least one object that lie on a given plane in the image, in accordance with an embodiment of the present disclosure.

Referring to FIG. 2A, illustrated is an exemplary image 200A showing identified features of at least one object that lie on a given plane 204 in the image, in accordance with an embodiment of the present disclosure. In the image 200A of a real-world environment, the at least one object detected by at least one server comprises objects 202A-202F depicted as a first box (marked 202A), a second box (marked 202B), a chair's legs (marked 202C, 202D, and 202E), and a sofa (marked 202F) that are in contact with the given plane 204, where the given plane 204 is a surface of a floor. Moreover, the at least one server may identify features 206A-206F depicted as an edge (marked 206A) of the first box, an edge (marked 206B) of the second box, points of contact (marked 206C, 206D, and 206E) of the chair's legs with the given plane 204, respectively, and a point of contact (marked 206F) of a leg of the sofa with the given plane 204 as same features that lie on the given plane 204.

Figure 2B:
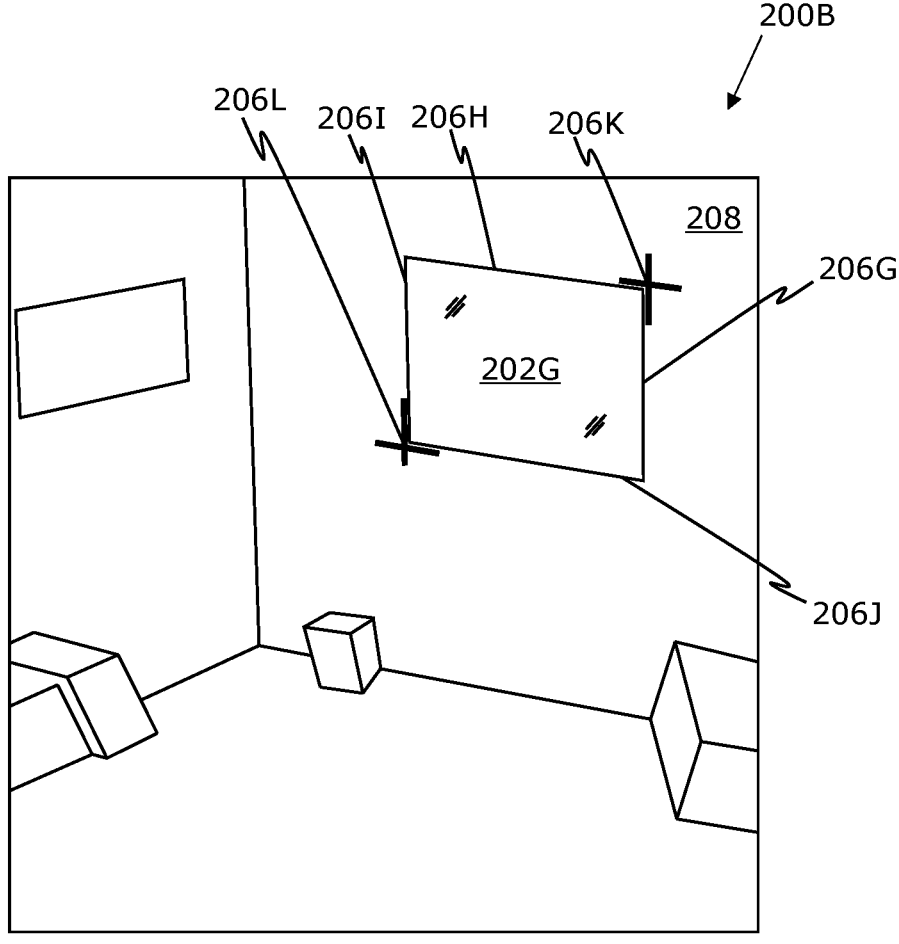
FIG. 2B is another exemplary image showing identified features of at least one object that lie on a given plane in the image, in accordance with an embodiment of the present disclosure.

Referring to FIG. 2B, illustrated is another exemplary image 200B showing identified features of at least one object that lie on a given plane 208 in the image, in accordance with an embodiment of the present disclosure. In the image 200B of the real-world environment, the at least one object detected by the at least one server comprises an object 202G depicted as a window that is in contact with the give plane 208, where the given plane 208 is a wall. Moreover, the at least one server identifies features 206G-206J, which are depicted as edges (marked 206G, 206H, 206I, and 206J) of the window as the same features that lie on the given plane 208. Herein, the at least one server could further identify points of intersections between the edges marked 206G and 206H and between the edged marked 206I and 206J as features 206K and 206L. Furthermore, the edges marked 206G and 206I are parallel to each other, while the edges marked 206H and 206J are parallel to each other.

Figure 3:
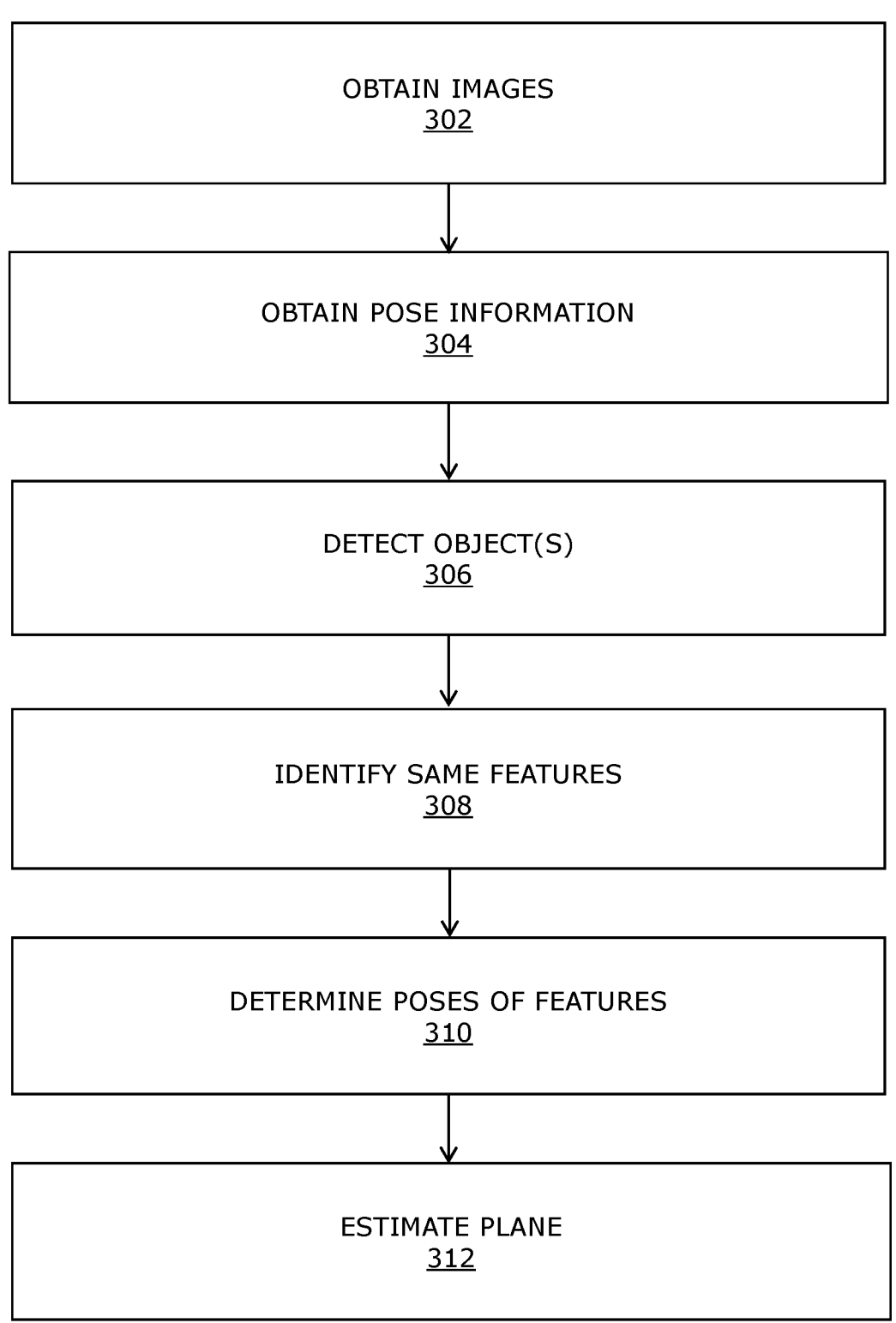
FIG. 3 illustrate steps of a computer-implemented method, in accordance with an embodiment of the present disclosure.

Referring to FIG. 3, illustrated are steps of a computer-implemented method for plane estimation, in accordance with an embodiment of the present disclosure. At step 302, at least two images of a real-world environment whose fields of view overlap at least partially, are obtained. At step 304, pose information indicative of corresponding camera poses from which the at least two images are captured is obtained. At step 306, at least one object that is in contact with the given plane present in the real-world environment is detected in the at least two images. At step 308, same features of the at least one object that lie on the given plane are identified in the at least two images. At step 310, poses of the same features are determined, wherein a pose of a given same feature is determined based on a disparity in two-dimensional positions of the given same feature in the at least two images and the corresponding camera poses from which the at least two images are captured. At step 312, the given plane is estimated based on the poses of the same features.

The aforementioned steps are only illustrative and other alternatives can also be provided where one or more steps are added, one or more steps are removed, or one or more steps are provided in a different sequence without departing from the scope of the claims herein.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. A system comprising at least one server configured to:
obtain at least two images of a real-world environment whose fields of view overlap at least partially;
obtain pose information indicative of corresponding camera poses from which the at least two images are captured, wherein the pose information is generated by a camera pose-tracking means that provides sixDegrees of Freedom (6DoF) tracking and comprises at least one of: an optics-based system with detectable markers, an inertial measurement unit (IMU or TIMU), or a simultaneous localization and mapping (SLAM) processor;
detect, in the at least two images, at least one object that is in contact with a given plane present in the real-world environment by executing an object-detection algorithm;
identify, in the at least two images, within portions of the images that represent an overlap of the fields of view, same features of the at least one object that lie on the given plane;
determine poses of the same features, wherein a pose of a given same feature is determined by triangulation, based on a disparity in two-dimensional positions of the given same feature in the at least two images and the corresponding camera poses from which the at least two images are captured; and
estimate the given plane based on the poses of the same features.

2. The system of claim 1, wherein the at least one server is configured to:
determine a distance between the given plane and a given camera pose from which a given image from amongst the at least two images is captured;
determine, based on said distance, a position in the given image at which at least one virtual object is to be superimposed; and
superimpose the at least one virtual object at the determined position in the given image to generate a given extended-reality image.

3. The system of claim 1, wherein the given plane is any of: a floor, a wall, a ceiling, a table top.

4. The system of claim 1, wherein the same features identified in the at least two images comprise at least one of:
three non-collinear points, an edge and a point that is not on the edge,
two edges that are intersecting, or
two edges that are parallel.

5. The system of claim 4, wherein a given point is any one of: a corner, a point of contact of a curved surface with the given plane, a point that is selected from an edge.

6. The system of claim 1, wherein the at least one server is further configured to:
access, from a data repository, information indicative of physical dimensions of the at least one object;
determine, from said information, at least one of: a physical length of a given edge of the at least one object that lies on the given plane, or a physical distance between at least two points of the at least one object that lie on the given plane; and
determine a pose of at least one of: the given edge or the at least two points, based on at least one of:
a camera pose from which a given image from amongst the at least two images is captured,
at least one of: a length of the given edge, a distance between the at least two points as represented in the given image, or
at least one of: the physical length of the given edge, the physical distance between the at least two points.

7. A computer-implemented method comprising:
obtaining at least two images of a real-world environment whose fields of view overlap at least partially;
obtaining pose information indicative of corresponding camera poses from which the at least two images are captured, wherein the pose information is generated by a camera pose-tracking means that provides sixDegrees of Freedom (6DoF) tracking and comprises at least one of: an optics-based system with detectable markers, an inertial measurement unit (IMU or TIMU), or a simultaneous localization and mapping (SLAM) processor;
detecting, in the at least two images, at least one object that is in contact with a given plane present in the real-world environment by executing an object-detection algorithm;
identifying, in the at least two images, within portions of the images that represent an overlap of the fields of view, same features of the at least one object that lie on the given plane;
determining poses of the same features, wherein a pose of a given same feature is determined by triangulation, based on a disparity in two-dimensional positions of the given same feature in the at least two images and the corresponding camera poses from which the at least two images are captured; and
estimating the given plane based on the poses of the same features.

8. The computer-implemented method of claim 7, further comprising:
determining a distance between the given plane and a given camera pose from which a given image from amongst the at least two images is captured;
determining, based on said distance, a position in the given image at which at least one virtual object is to be superimposed; and
superimposing the at least one virtual object at the determined position in the given image for generating a given extended-reality image.

9. The computer-implemented method of claim 7, wherein the given plane is any of: a floor, a wall, a ceiling, a table top.

10. The computer-implemented method of claim 7, wherein the same features identified in the at least two images comprise at least one of:

three non-collinear points, an edge and a point that is not on the edge, two edges that are intersecting, or two edges that are parallel.

11. The computer-implemented method of claim 10, wherein a given point is any one of: a corner, a point of contact of a curved surface with the given plane, a point that is selected from an edge.

12. The computer-implemented method of claim 7, further comprising:

accessing, from a data repository, information indicative of physical dimensions of the at least one object;

determining, from said information, at least one of: a physical length of a given edge of the at least one object that lies on the given plane or a physical distance between at least two points of the at least one object that lie on the given plane; and determining a pose of at least one of: the given edge or the at least two points, based on at least one of:

a camera pose from which a given image from amongst the at least two images is captured, at least one of: a length of the given edge, a distance between the at least two points as represented in the given image, or at least one of: the physical length of the given edge, the physical distance between the at least two points.

13. A computer program product comprising a non-transitory machine-readable data storage medium having stored thereon program instructions that, when executed by a processor, cause the processor to:

obtain at least two images of a real-world environment whose fields of view overlap at least partially;

obtain pose information indicative of corresponding camera poses from which the at least two images are captured, wherein the pose information is generated by a camera pose-tracking means that provides sixDegrees of Freedom (6DoF) tracking and comprises at least one of: an optics-based system with detectable markers, an inertial measurement unit (IMU or TIMU), or a simultaneous localization and mapping (SLAM) processor;

detect, in the at least two images, at least one object that is in contact with a given plane present in the real-world environment by executing an object-detection algorithm;

identify, in the at least two images, within portions of the images that represent an overlap of the fields of view, same features of the at least one object that lie on the given plane;

determine poses of the same features, wherein a pose of a given same feature is determined by triangulation, based on a disparity in two-dimensional positions of the given same feature in the at least two images and the corresponding camera poses from which the at least two images are captured; and estimate the given plane based on the poses of the same features.

14. The computer program product of claim 13, wherein the program instructions, when executed by the processor, further cause the processor to:

determine a distance between the given plane and a given camera pose from which a given image from amongst the at least two images is captured;

determine, based on said distance, a position in the given image at which at least one virtual object is to be superimposed; and superimpose the at least one virtual object at the determined position in the given image to generate a given extended-reality image.

15. The computer program product of claim 13, wherein the given plane is any of: a floor, a wall, a ceiling, a table top.

16. The computer program product of claim 13, wherein the same features identified in the at least two images comprise at least one of:

three non-collinear points, an edge and a point that is not on the edge, two edges that are intersecting, or two edges that are parallel.

17. The computer program product of claim 16, wherein a given point is any one of: a corner, a point of contact of a curved surface with the given plane, a point that is selected from an edge.

18. The computer program product of claim 13, wherein the program instructions, when executed by the processor, further cause the processor to:

access, from a data repository, information indicative of physical dimensions of the at least one object;

determine, from said information, at least one of: a physical length of a given edge of the at least one object that lies on the given plane or a physical distance between at least two points of the at least one object that lie on the given plane; and determine a pose of at least one of: the given edge or the at least two points, based on at least one of:

a camera pose from which a given image from amongst the at least two images is captured, at least one of: a length of the given edge, a distance between the at least two points as represented in the given image, or at least one of: the physical length of the given edge, the physical distance between the at least two points.

* * * * *